United States Patent
Chan et al.

(10) Patent No.: US 8,220,001 B2
(45) Date of Patent: Jul. 10, 2012

(54) ADAPTIVE CLUSTER TIMER MANAGER

(75) Inventors: Wilson Chan, San Mateo, CA (US);
Deepti Srivastava, San Francisco, CA (US); Tolga Yurek, Foster City, CA (US); Yu Kin Ho, Fremont, CA (US); John Hsu, Sunnyvale, CA (US); Tak Fung Wang, Redwood City, CA (US); Angelo Pruscino, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 819 days.

(21) Appl. No.: 12/371,534

(22) Filed: Feb. 13, 2009

(65) Prior Publication Data
US 2010/0211959 A1    Aug. 19, 2010

(51) Int. Cl.
*G06F 9/455* (2006.01)
*G06F 9/46* (2006.01)

(52) U.S. Cl. ...................................................... 718/107
(58) Field of Classification Search ....................... None
See application file for complete search history.

(56) References Cited

U.S. PATENT DOCUMENTS

| | | | |
|---|---|---|---|
| 6,405,337 B1 * | 6/2002 | Grohn et al. | 714/749 |
| 6,526,433 B1 * | 2/2003 | Chang et al. | 709/201 |
| 7,307,951 B2 * | 12/2007 | Dittmann et al. | 370/230 |
| 7,478,027 B2 * | 1/2009 | Ban | 703/13 |

* cited by examiner

*Primary Examiner* — Corey S Faherty
(74) *Attorney, Agent, or Firm* — Hickman Palermo Truong Becker Bingham Wong LLP

(57) ABSTRACT

Described herein are techniques for adaptively managing timers that are used in various layers of a node. In many cases, the number of timers that occur in the system is reduced by proactively and reactively adjusting values of the timers based on conditions affecting the system, thereby making such a system to perform significantly better and more resiliently than otherwise.

26 Claims, 4 Drawing Sheets determine a set of current timeout period values for a set of timers 310 based on a hierarchy, adjust a first timer in the set of timers to a first new timeout period value 320 determine a set of current timeout period values for a set of timers 310 based on a hierarchy, adjust a first timer in the set of timers to a first new timeout period value 320

FIG. 3A

```
┌─────────────────────────────────────┐
│   monitor one or more conditions that│
│   affect one or more components in   │
│   the plurality of components on the │
│              node  350               │
└─────────────────┬───────────────────┘
                  │
┌─────────────────┴───────────────────┐
│     in response to the one or more   │
│    conditions, prevent one or more   │
│  timeouts from occurring by adjusting│
│   a second timeout parameter in the  │
│ set of timeout parameters to a second│
│          new value  360              │
└─────────────────────────────────────┘
```

FIG. 3B

ADAPTIVE CLUSTER TIMER MANAGER

FIELD OF THE INVENTION

The present invention relates to managing timers in computer systems, and in particular, to adaptively managing timers by one or more nodes in a multi-node system.

BACKGROUND OF THE INVENTION

In a multi-node system, tasks run concurrently in a distributed manner on nodes of the multi-node system. A task may wait for completions of other local or remote tasks. Timers are often used to prevent a task from forever waiting for completion of another task.

According to one scheme, timers may be set individually and loosely. For example, a software developer that creates software performing these tasks may set the timers based on an understanding of what the likely runtime environment will be. A system administrator managing the multi-node system may set the timers based on an understanding of what the actual runtime environment is.

As tasks may be interrelated in a complex way, a timer expires in one task often affects other tasks. For example, a database access task may depend on an OS task, which in turn may depend on a disk I/O task. When a timer in the disk I/O task expires, this may cause the disk I/O task to experience a timeout error. In turn, the timeout error may be returned to the OS task and the database access task. Thus, a timeout error occurring in one task may have cascading negative effects on other tasks.

In a loosely managed system, multiple inopportune timeout errors caused by a common problem may occur at substantially the same time. These near-simultaneous timeout errors may cause a part, or all, of a node to be deemed out of service, and may even bring down other nodes in the multi-node system.

As clearly shown, techniques are needed to improve management of timers in a multi-node system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A and FIG. 3B are examples of processing flow for managing timers on an example node according to an embodiment of the present invention.

DETAILED DESCRIPTION OF THE INVENTION

Techniques for adaptively managing timers in a multi-node system are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 1:
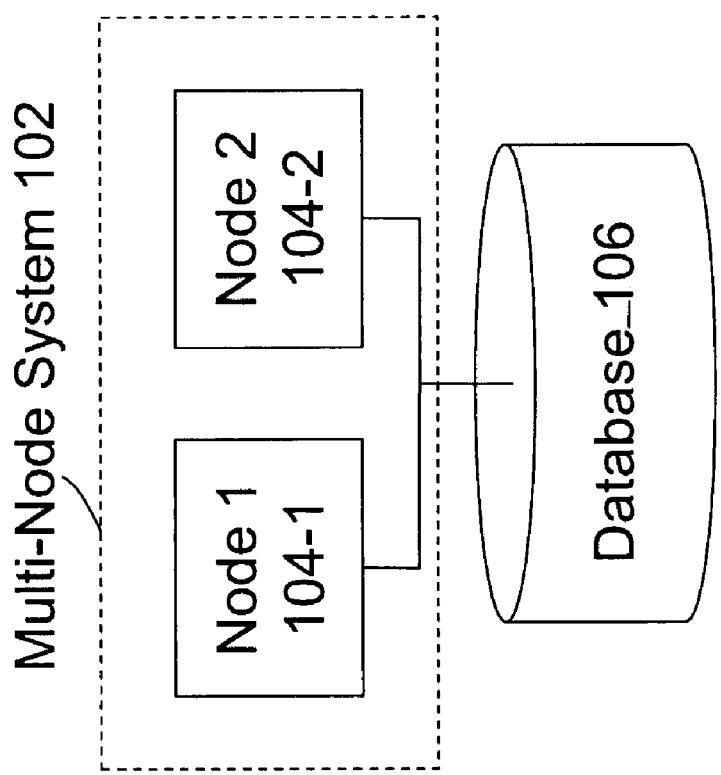
FIG. 1 illustrates an example system that comprises an example multi-node system according to an embodiment of the present invention.

According to an embodiment of the present invention, as illustrated in FIG. 1, the techniques may be performed by a multi-node system 102, which comprises multiple interconnected nodes (e.g., 104-1 and 104-2 as shown). The system 102 may provide user applications accesses to a database 106. The nodes (104) in the multi-node system 102 may be in the form of computers (e.g. work stations, personal computers) interconnected via a network. Alternatively, the nodes (104) may be nodes of a grid, where each node is interconnected on a rack. The grid may host multiple multi-node systems. Each node 104 may be a separate physical computer, or a separate domain (which, for example, may run inside a virtual machine) among a plurality of domains that partition a physical computer. In embodiments where some of the nodes 104 may be domains, each domain behaves independently like a separate physical computer and constitutes a separate logical computer.

Figure 2:
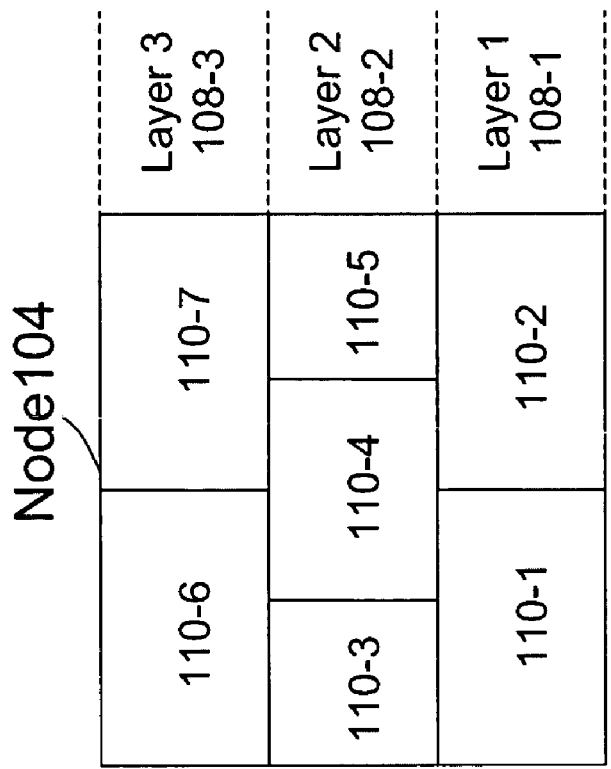
FIG. 2 illustrates example layers and components on an example node according to an embodiment of the present invention.

In some embodiments, as illustrated in FIG. 2, instead of implementing all software functionality in a single monolithic package, software on a node 104 may comprise a layered structure with multiple software layers (e.g., 108-1 through 108-3). Each layer 108 is an aggregate of software components 110 at a particular software abstraction level. Except for the lowest layer, an upper layer may be built on top of its lower layer(s). For example, a function in an upper layer may invoke functions in lower layers to perform certain kinds of work required by the upper layer function.

Examples of layers 108 may be a low level I/O layer (108-1), an OS layer (108-2), a database server layer (108-3), and so on.

A component 110 in a layer may be executed by one or more processors to perform work of various related types. A piece of work performed by a component 110, when executed by processors, may be referred to as a task. A component 110 may perform more than one type of task. For example, a database access component 110 may perform various related types of tasks such as receiving a message, invoking another component 110, or returning a query result.

A component 110 in a layer may be called by other components in the same layer or in different layers. A task performed by a component may cause making calls to other components in several layers. Hence, the task may comprise other tasks that are performed by the other components in the same layer or in different layers.

For the purpose of illustration only, layer 1 (108-1) may be the lowest layer that comprises a network I/O component (110-1) and a disk I/O component (110-2). Layer 2 (108-2) may be a layer that is built on top of layer 1. As illustrated, layer 2 comprises a file system component (110-3), a clusterware component (110-4), and a reliable transport component (110-5). Layer 3 (108-3) may be a layer that is built on top of layers 1 and 2. As illustrated, layer 3 comprises a data query service component (110-6) and a topology configuring component (110-7).

A component 110 depends on another component 110, if the former component 110 comprises code which, when executed, makes call to the latter component. For the purpose of illustration, the file system component 110-3 in layer 2 may depend on the disk I/O component 110-1 in layer 1, as a function in the file system component 110-3, when executed, makes calls to functions in the disk I/O component 110-1.

Similarly, the clusterware component 110-4 in layer 2 may depend on the disk I/O component 110-1 (e.g., for retrieving configuration information) and the network I/O component (e.g., for sending and receiving messages from other nodes 104 in the multi-node system 102) in layer 1. The reliable transport component 110-5 in layer 2 may depend on the network I/O component in layer 1. The database query service component (110-6) in layer 3 may depend on the file system component 110-3 and the clusterware component 110-4 in layer 2. The topology configuring component (110-7) in layer 3 may depend on the clusterware component 110-4 and the reliable transport component 110-5 in layer 2.

Inter-Relationships Among Timers

At any given time, zero or more tasks may be performed by the components 110 deployed on a node 104. A task may use zero, one or more timers to set time boundaries for other tasks on which the task depends. In other words, a depending task may set a timer for completion of a depended-on task.

For example, the topology configuring component (110-7) in layer 3 may perform a task by executing a "determinePeerNodeStatus( )" function. This function may comprise code that sends a ping message to a peer node in the multi-node system and calls a "sendMessageToPeerNode" function provided by the reliable transport component (110-5). This latter function may be invoked by the code in the former function as follows:

ret=sendMessageToPeerNode(msg, msg_len, PING_MSG_TIMER_LEN); A timer may be initiated in the calling task. This timer expires after a time period specified by PING_MSG_TIMER_LEN. If the "sendMessageToPeerNode( )" in the reliable transport component (110-5) does not return, this timer causes a timeout error to be returned. The "PING_MSG_TIMER_LEN" may be a global or local variable that may be read and set with various values by a timer manager, for example, depending on one or more system conditions. Furthermore, the "sendMessageToPeerNode" may comprise code that calls network I/O in layer 1 and may set its own timer. In some embodiments, the length of a timer needs not to be passed in a function call to set up a timer. In a particular embodiment, the called function may automatically set up a timer in the calling task. The length of timer may be obtained from a globally or locally accessible variable.

In some embodiments, timer-related functions that are invoked by other functions to actually set up, cancel, or change a timer may be placed in a single software package. For example, when sendMessageToPeerNode( ) is called, a timer-related function "createTimer(PING_MSG_TIMER_LEN)" may be called. In a particular embodiment, these timer-related functions may be placed in a "timer" library that may be linked to other software components in various layers at the software build time or at runtime. Thus, when tasks in different layers call timer-related functions, a central management point of timers may be implemented in and provided within the "timer" library.

As used herein, the phrases "a depending task" and "a depended-on task" refers to a relationship in which the depending task invokes the depended-on task to perform work of a certain type. An example of (a) a depending task and (b) a depended-on task may respectively be (a) a task performed by the clusterware component 110-4 that provides access coordination to database 106 and (b) a task performed by the disk I/O component 110-1 that provides access to a region of storage in the database 106. The former depends on the latter because the former may invoke the latter to read a configuration file.

Timers are used by tasks performed by different components in different layers. For example, the depended-on task in the previous example may be a depending task to another task performed by a different component in a different layer.

Due to the inter-relationships among tasks/components, timers may be similarly inter-related. If a first timer in a depending task is set shorter than a second timer in its depended-on task, then it is possible that when the first timer expires, the second timer in the depended-on task has not expired. Indeed, the depended-on task may still be doing its work. This shows that the first timer depends on the second timer in the same way as the depending task depends on the depended-on task. That is, a dependent type of inter-relationship exists between a first timer and a second timer, if the first timer used by a first task is dependent on completion of a second task that uses the second timer.

For example, a first timer used by a global lock service task is regarded as dependent on a second timer used by a storage access task, if the global lock service task depends on completion of the storage access task.

Likewise, a topology reconfiguring task may use a timer so that the task will not wait forever for completion of another messaging task in a lower layer. With the timer, the reconfiguration task will terminate if it does not receive a reply or an acknowledgment back in a certain period after a message has been sent. The messaging task may use another timer on its own. The timer used by the topology reconfiguration task depends on the other timer used by the messaging task, due to the inter-dependent relationship between the two tasks.

In some embodiments, therefore, timers have the same inter-dependent relationships as the tasks that use these timers.

Loosely Managing Timers

In a system in which timers are loosely managed, a timer in a task may be inappropriately set with no relation to other timers. Needless timeout errors may occur as a result. For example, when the multi-node system boots up, distributed system loading tasks on all the nodes 104 of the multi-node system may need to access the common database 106. These distributed system loading tasks may simultaneously experience a slow cluster-wide I/O problem affecting their access to the database 106. Lower layer tasks that experience the slow cluster-wide I/O problem may cause timeout errors in upper layer tasks if the timeout period values of related timers in the upper layer tasks are too small for such a case. Subsequently, some critical inter-nodal messaging (e.g., related to topology discovery) may also experience timeout errors, causing a node to believe other nodes to be out of service.

To deal with this scenario, in the system in which the timers are loosely managed, these timers may be lengthened to accommodate occasional slow cluster-wide I/O conditions for future operation. However, this approach may not be effective. For example, other higher layer tasks that are above the tasks whose timers have been lengthened may also have timers set too small for the circumstances.

In addition, simply lengthening timers for all system load situations create other undesirable side-effects. For example, there may be situations in which only one or two specific nodes experience some local problems. The multi-node system might perform better without the affected nodes. In these situations, simply lengthening timers may be counter-productive and result in a system with relatively low availability, as it may take too much time, or may even be in vain, for the system to wait for the affected nodes to finish dealing with their problems.

Hierarchy of Timers

Unlike the system in which timers are loosely managed, under new techniques described herein, timers in the multi-node system 102 may be systematically structured according to inter-relationships between the timers. In some embodiments, a cluster-wide mechanism may be provided to structure all, or some, of the timers used in the cluster 102. In some alternative embodiments, a node-based mechanism may be provided to structure all, or some, of the timers in a particular node. For timers that affect other nodes, node-based mechanisms may communicate with each other and coordinate setting of these timers. In still other embodiments, both a cluster-wide mechanism and node-based mechanisms work in combination. For example, the cluster-wide mechanism may be responsible for initiating adjustments to cluster-wide timers, while delegating to the node-based mechanisms to perform actual adjustments to the timers.

In some embodiments, a hierarchy of timers may be used to represent timers as vertexes and inter-relationships among timers as edges between vertexes. In some embodiments, the hierarchy of timers has a layered structure corresponding to that of software layers 108. Each layer 108 may have its own timer manager that is responsible for timers set by components in that layer. A timer manager can query about timers managed by another timer manager. Thus, a timer manager can be aware of other timers used in other layers.

Timers used by the lowest layer 108 are comparatively important. For example, a common task in the lowest layer may be depended on by many other tasks in upper layers. Under new techniques described herein, timers used by upper layers are structured to indicate their dependencies on timers used by lower layers.

In some embodiments, if a task A depends on a task B, then task B's timer will be set shorter than task A's timer, in order to ensure that task A would not time out while B has not timed out yet. In this way, tasks in the upper layers do not prematurely terminate before a task in the lower layer has a chance to complete. As used herein, the phrase "a timer is set shorter" means that the timer used by a task now expires in a shorter time period than before.

Consolidating Timers

Under new techniques described herein, inter-relationships between timers may be determined in a number of ways. For example, two timers may be determined as inter-related if tasks that use the timers are programmatically related. For example, a first timer may be used by a first routine that is the caller of a second routine that uses a second timer. Based on this caller-callee relationship, the first timer is determined to be dependent on the second timer. Similarly, a first timer may be used by a first task that sends a request to, and subsequently expects to receive a reply or an acknowledgment from, a second task that uses a second timer. Based on this requester-responder relationship, the first timer is determined to be dependent on the second timer.

Two timers may also be determined as inter-related through horizontal relationships. As noted before, a first timer may be used by a lower layer task while a second timer may be used by a related upper layer task. Based on this vertical relationship, the first timer is determined to be dependent on the second timer. However, a process may involve several threads concurrently. While one thread executes the above-mentioned upper layer task, other threads may execute other tasks in the same layer as that of the upper layer task. These other tasks may require occasional coordination or synchronization with the upper layer task. These other tasks may also use other timers. Even though the other tasks may not have vertical relationships with the lower layer task described above, these other tasks nevertheless may depend on the lower layer task through the other tasks' horizontal relationships with the upper layer task (i.e., due to the occasional coordination and synchronization mentioned above). Thus, these other timers in these other tasks should also be lengthier than the lower layer timer, even though the other timers do not have direct depended-on relationships with the lower layer timer.

Inter-dependent relationships between timers may also be specified by software developers as a part of software configuration data. For example, in a software package containing a component 110, a configuration data file may be used by a software developer to specify any inter-dependent relationships among timers used within the component and other timers outside the component. A timer manager on the node 104 may read the configuration data file and determine these inter-relationships among the timers.

Consolidating Timers

Timers may be consolidated based on inter-relationships in the hierarchy. In particular, timers on the node 104 can be deemed as constituting a partially ordered set. Timers at the lowest layer of the hierarchy may be seeded with appropriate timeout period values. Timers at upper layers of the hierarchy may henceforth be set according to the partial order in the hierarchy and based on the timers in lower layers. If it is a vertical relationship, say timer B depends on timer A, then the timeout period value of B must be greater than the timeout period value of A. For example, the value of B may be the value of A plus a safety margin. If it is a horizontal relationship, say timer D is horizontally related to timer C, then both the value of D and the value of C must be greater than the value of E on which C depends.

Timers may be proactively adjusted during installation time and system loading time. Timers may also be reactively managed at runtime. For example, at runtime, when a number of timers all occur at the same time, it may be determined based on the hierarchy of timers whether these timers are related. If that is the case, a shorter timer may be set. Log and/or statistic information maintained for the node 104 may be used to determine how long a task takes. If the average time involving the same task now takes much longer time than a typical time, then the timer may be lengthened at runtime. Other timers that have inter-dependent relationships with the timer may be correspondingly lengthened. In some embodiments, timeout errors for currently scheduled timers may be suppressed. As used herein, the phrase "a timer is lengthened" means that a timer used in a task now expires in a longer period than before, while the phrase "a timer is shortened" means that a timer used in a task now expires in a shorter period than before.

Under new techniques described herein, timer managers monitor expirations of timers. Thus, even if a depending timer has been set to a wrong timeout period value, the problem may be corrected at runtime based in part on the hierarchy of timers and the information gathered through monitoring.

For example, a timer may have a range of timeout period values to be chosen from, say 3 to 300 seconds. A preset value of 150 may be based on estimated response time of a system and may not be appropriate once a component or the node 104 is placed in actual service. In some embodiments, log information for timers and task completions that have occurred may be maintained for the node 104. From the log information, it may be discovered that a timer has been set too long or too short or that a task always times out or always completes within a much shorter period of time. Based on this information, a new value for the timer may be determined and set.

Under new techniques described herein, availability of the system may be improved. For example, an operator of the system may need to honor a specific level-of-service agreement with a customer. To provide high availability contracted with the customer, timers affecting the system load time may be set to relatively short timeout period values even at the expense of excluding some nodes experiencing local problems. On the other hand, to provide support for a large number of users with only reasonable response times, the cluster 102 may need to have as many up nodes as possible. In that case, the system load related timers may be set to relatively large timeout period values.

As this discussion shows, under new techniques described herein, timers may be programmatically and/or automatically tuned and appropriately set, thereby avoiding individually and loosely managing these timers.

Example Process

FIG. 3A illustrates an example process under new techniques described herein. In block 310, a timer manager on a node 104 determines a set of current timeout period values for a set of timers. Here, the set of timers forms a hierarchy based on a set of inter-dependent relationships among a plurality of components on a node.

In some embodiments, based on the inter-dependency hierarchy, the timer manager can identify a proper subset of timers in the set of timers. Other timers in the set of timers depend on the proper subset of timers.

In block 320, based on the inter-dependency hierarchy, the timer manager adjusts a first timer in the set of timers to a first new timeout period value. This first timer is used by a first task performed by a first component in the plurality of components. For example, the first timer may be used to set a time boundary for completion of a second task in a second component in the set of components. Here, the first task may depend on (completion of) the second task at runtime. A second timeout period value of a second timer may be used by the second task in the second component.

To adjust the first timer in the set of timers to the first new timeout period value, the timer manager determines whether the first timeout period value is not greater than the second timeout period value plus a safety margin. In response to determining that the first timeout period value is not greater than the second timeout period value plus the safety margin, the timer manager adjusts the first timer to the new first timeout period value, wherein the new first timeout period value is selected to be greater than the second timeout period value plus the safety margin.

Additionally and/or alternatively, to adjust the first timer in the set of timers to the first new timeout period value, the timer manager may determine a range of acceptable timeout period values for the first timer, based on the hierarchy of timers. Based on one or more considerations such as what type of platform the multi-node system is hosted on or what service level should be, the timer manager sets the first new timeout period value to be a timeout period value selected from the range of acceptable timeout period values.

In some embodiments, the first task may be a part of process that runs on node 104 and is invoked by a first call to a first routine in a component. In a particular embodiment, the first call specifies a timeout period value for the first timer. In an alternative embodiment, the first call does not specify a timeout period value for the first timer. For example, the first timer may be specified in a configuration data file, as an environment variable, as a command line parameter, and so on. The first timer may also be obtained from a global list on node 104. Indeed, all timeout period values of timers in the plurality of timers may be stored in a configuration data store that is global to the node.

Alternatively, timeout period values of timers in the plurality of timers may be stored in a configuration data store that is global to a multi-node system (e.g., the multi-node system 102) of which node 104 is one of the nodes in the multi-node system.

In some embodiments, the set of components forms two or more layers. The first component whose timer is adjusted is in a first layer in the two or more layers. In a particular embodiment, the first layer is higher than at least one layer in the two or more layers.

The first timer that is adjusted by the timer manager may have a default timeout period value, or a user configured timeout period value.

In some embodiments, timers may be continuously adjusted based on system conditions. For example, the timer manager may continue to monitor one or more conditions (e.g., whether timers occur or whether tasks are completed well ahead of timer timeout period values) that affect one or more components (e.g., a component responsible for retrieving data blocks) in the plurality of components on the node 104. Based on the conditions, the timer manager may suppress expiration of a timer that is associated with the first timer during runtime of the first task. Alternatively and/or additionally, based on the conditions, the timer manager may delay expiration of a timer that is associated with the first timer during runtime of the first task.

The first task may be any task that runs on node 104. For example, the first task may be a topology reconfiguration task or may be a system load task.

In some embodiments, based on the hierarchy of timers, the timer manager creates a partially ordered set of timers from the set of timers. The timer manager can ensure that a timeout period value of a descendent timer in the partially ordered set is greater than a timeout period value of a precedent timer in the partially ordered set.

FIG. 3B illustrates an example process that may be used to adjust timeout period values of timers at runtime. In block 350, the timer manager on node 104 monitors one or more conditions that affect one or more components in the plurality of components on the node.

In monitoring the one or more conditions, the timer manager may determine one or more average times of completion for one or more tasks in one or more components in the plurality of components.

Alternatively and/or additionally, in monitoring the one or more conditions, the timer manager may detect that one or more timers have expired. The timer manager subsequently may lengthen one or more timers in the set of timers.

In block 360, in response to the one or more conditions, the timer manager prevents one or more timeout errors from occurring by adjusting a second timer in the set of timers to a second new timeout period value. Here, the second timer is used by a second task performed by a second component in the plurality of components.

In embodiments in which the node 104 is one of multiple nodes in a multi-node system, the one or more conditions monitored by the timer manager may include a condition that affects all of the multiple nodes. In these embodiments, the second task may be used for reconfiguring the multi-node system.

In these embodiments, it is also possible that the one or more conditions monitored by the timer manager include a condition that only affects the node 104 locally (e.g., a CPU load problem on the node 104).

Changes in timers may vertically propagate from a lower layer to higher layers. Changes in timers in a layer may also be propagated to other horizontally inter-related timers in the same layer. Thus, in these situations, the timer manager may further adjust a third timer to a third new timeout period value, which is greater than the second new timeout period value adjusted in block 360.

Hardware Overview

Figure 4:
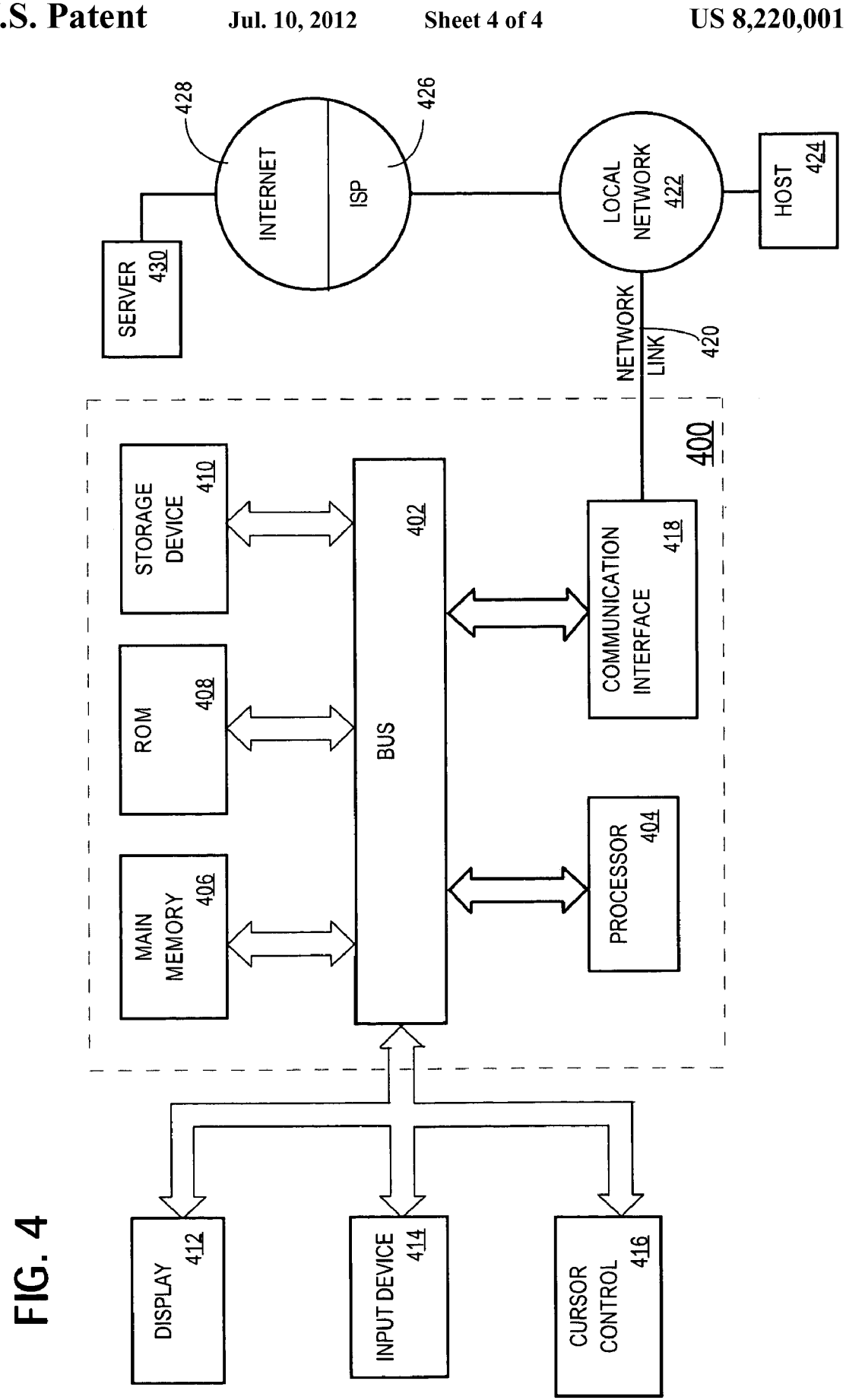
FIG. 4 is a block diagram of a computer system that may be used to implement an embodiment of the present invention.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to an embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media and volatile media. Non-volatile media includes, for example, optical or magnetic disks, such as storage device 410. Volatile media includes dynamic memory, such as main memory 406.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
   determining a set of current timeout period values for a set of timers, wherein the set of timers forms a hierarchy based on a set of inter-dependent relationships among a plurality of components on a node; and
   based on the hierarchy, adjusting a first timer in the set of timers to a first new timeout period value, wherein the first timer is used by a first task performed by a first component in the plurality of components;
   wherein the method is performed by a computer programmed to be a special purpose machine pursuant to instructions from program software.

2. The method of claim 1, further comprising:
   monitoring one or more conditions that affect tasks performed by one or more components in the plurality of components on the node; and
   in response to the one or more conditions, preventing one or more timeout errors from occurring by adjusting a second timer in the set of timers to a second new timeout period value, wherein the second timer is used by a second task performed by a second component in the plurality of components.

3. The method of claim 2, wherein the node is one of multiple nodes in a multi-node system and wherein the one or more conditions include a condition that affects all of the multiple nodes.

4. The method of claim 2, wherein said monitoring one or more conditions that affect one or more components in the plurality of components on the node include determining one or more average times of completion for the tasks performed by the one or more components in the plurality of components.

5. The method of claim 2, wherein said monitoring one or more conditions that affect tasks performed by one or more components in the plurality of components on the node include:
   detecting that one or more timers have expired; and
   lengthening at least one of the one or more timers.

6. The method of claim 2, further comprising:
   based on the hierarchy, adjusting a third timer to a third new timeout period value, wherein the hierarchy indicates that the third timer depends on the second timer and wherein the third new timeout period value is greater than the second new timeout period value.

7. The method of claim 2, wherein the node is one of multiple nodes in a multi-node system and wherein the one or more conditions include a condition that only affects the node.

8. The method of claim 1, further comprising based on the hierarchy, identifying a proper subset of timers in the set of timers, wherein other timers in the set of timers depend on the proper subset of timers.

9. The method of claim 1, wherein:
   the first timer sets a time boundary for completion of a second task performed by a second component in the set of components;
   the first task depends on the second task; and
   a second timeout period value of a second timer is used by the second task performed by the second component; and
   wherein said adjusting a first timer in the set of timers to a first new timeout period value comprises:
      determining whether the first timeout period value is not greater than the second timeout period value plus a safety margin; and
      in response to determining that the first timeout period value is not greater than the second timeout period value plus the safety margin, adjusting the first timer to the new first timeout period value, wherein the new first timeout period value is greater than the second timeout period value plus the safety margin.

10. The method of claim 1, wherein the set of components forms two or more layers.

11. The method of claim 1, further comprising:
    monitoring one or more conditions that affect tasks performed by one or more components in the plurality of components on the node; and
    suppressing expiration of a timer that is associated with the first timer during runtime of the first task.

12. The method of claim 1, further comprising:
    monitoring one or more conditions that affect tasks performed by one or more components in the plurality of components on the node; and
    delaying expiration of a timer that is associated with the first timer during runtime of the first task.

13. The method of claim 1, further comprising:
    based on the hierarchy, creating a partially ordered set of timers from the set of timers; and
    ensuring that a timeout period value of a descendent timer in the partially ordered set is greater than a timeout period value of a precedent timer in the partially ordered set.

14. The method of claim 1, wherein said adjusting a first timer in the set of timers to a first new timeout period value comprises:
    based on the hierarchy, determining a range of acceptable timeout period values for the first timer; and
    based on one or more considerations, selecting the first new timeout period value from the range of acceptable timeout period values.

15. A computer-readable storage medium storing one or more sequences of instructions which, when executed by one or more processors, causes the one or more processors to perform:
    determining a set of current timeout period values for a set of timers, wherein the set of timers forms a hierarchy based on a set of inter-dependent relationships among a plurality of components on a node; and
    based on the hierarchy, adjusting a first timer in the set of timers to a first new timeout period value, wherein the first timer is used by a first task performed by a first component in the plurality of components.

16. The medium of claim 15, wherein the one or more sequences of instructions further comprise instructions which, when executed by one or more processors, causes the one or more processors to perform:
    monitoring one or more conditions that affect tasks performed by one or more components in the plurality of components on the node; and
    in response to the one or more conditions, preventing one or more timeout errors from occurring by adjusting a second timer in the set of timers to a second new timeout period value, wherein the second timer is used by a second task performed by a second component in the plurality of components.

17. The medium of claim 16, wherein the one or more sequences of instructions further comprise instructions which, when executed by one or more processors, causes the one or more processors to perform:
  detecting that one or more timers have expired; and
  lengthening at least one of the one or more timers.

18. The medium of claim 16, wherein the one or more sequences of instructions further comprise instructions which, when executed by one or more processors, causes the one or more processors to perform:
  based on the hierarchy, adjusting a third timer to a third new timeout period value, wherein the hierarchy indicates that the third timer depends on the second timer and wherein the third new timeout period value is greater than the second new timeout period value.

19. The medium of claim 15, wherein the one or more sequences of instructions further comprise instructions which, when executed by one or more processors, causes the one or more processors to perform:
  based on the hierarchy, identifying a proper subset of timers in the set of timers, wherein other timers in the set of timers depend on the proper subset of timers.

20. The medium of claim 15, wherein:
  the first timer sets a time boundary for completion of a second task performed by a second component in the set of components;
  the first task depends on the second task; and
  a second timeout period value of a second timer is used by the second task in the second component; and
  wherein the one or more sequences of instructions further comprise instructions which, when executed by one or more processors, causes the one or more processors to perform:
    determining whether the first timeout period value is not greater than the second timeout period value plus a safety margin; and
    in response to determining that the first timeout period value is not greater than the second timeout period value plus the safety margin, adjusting the first timer to the new first timeout period value, wherein the new first timeout period value is greater than the second timeout period value plus the safety margin.

21. The medium of claim 15, wherein the one or more sequences of instructions further comprise instructions which, when executed by one or more processors, causes the one or more processors to perform:
  monitoring one or more conditions that affect tasks performed by one or more components in the plurality of components on the node; and
  suppressing expiration of a timer that is associated with the first timer during runtime of the first task.

22. The medium of claim 15, wherein the one or more sequences of instructions further comprise instructions which, when executed by one or more processors, causes the one or more processors to perform:
  monitoring one or more conditions that affect tasks performed by one or more components in the plurality of components on the node; and
  delaying expiration of a timer that is associated with the first timer during runtime of the first task.

23. An apparatus comprising:
  one or more processors; and
  one or more sequences of instructions which, when executed by the one or more processors, causes the one or more processors to perform:
    determining a set of current timeout period values for a set of timers, wherein the set of timers forms a hierarchy based on a set of inter-dependent relationships among a plurality of components on a node; and
    based on the hierarchy, adjusting a first timer in the set of timers to a first new timeout period value, wherein the first timer is used by a first task performed by a first component in the plurality of components.

24. The apparatus of claim 23, wherein the one or more sequences of instructions further comprise instructions which, when executed by one or more processors, causes the one or more processors to perform:
  monitoring one or more conditions that affect tasks performed by one or more components in the plurality of components on the node; and
  in response to the one or more conditions, preventing one or more timeout errors from occurring by adjusting a second timer in the set of timers to a second new timeout period value, wherein the second timer is used by a second task performed by a second component in the plurality of components.

25. The apparatus of claim 23, wherein the one or more sequences of instructions further comprise instructions which, when executed by one or more processors, causes the one or more processors to perform:
  monitoring one or more conditions that affect tasks performed by one or more components in the plurality of components on the node; and
  suppressing expiration of a timer that is associated with the first timer during runtime of the first task.

26. The apparatus of claim 23, wherein the one or more sequences of instructions further comprise instructions which, when executed by one or more processors, causes the one or more processors to perform:
  monitoring one or more conditions that affect tasks performed by one or more components in the plurality of components on the node; and
  delaying expiration of a timer that is associated with the first timer during runtime of the first task.

* * * * *